US010091222B1

(12) United States Patent
Langton et al.

(10) Patent No.: US 10,091,222 B1
(45) Date of Patent: Oct. 2, 2018

(54) DETECTING DATA EXFILTRATION AS THE DATA EXFILTRATION OCCURS OR AFTER THE DATA EXFILTRATION OCCURS

(71) Applicant: Juniper Networks, Inc., Sunnyvale, CA (US)

(72) Inventors: Jacob Asher Langton, Oakland, CA (US); Kyle Adams, Brisbane, CA (US); Zhenxin Zhan, Fremont, CA (US); Daniel J. Quinlan, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 81 days.

(21) Appl. No.: 14/674,251

(22) Filed: Mar. 31, 2015

(51) Int. Cl.
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |

(52) U.S. Cl.
CPC ...... *H04L 63/1425* (2013.01); *H04L 63/1441* (2013.01)

(58) Field of Classification Search
USPC .................................................... 726/22–25
See application file for complete search history.

(56) References Cited

U.S. PATENT DOCUMENTS

| 8,181,036 | B1 * | 5/2012 | Nachenberg | ........ H04L 63/1416 709/224 |
| 8,291,500 | B1 | 10/2012 | Bojaxhi et al. | |
| 8,321,940 | B1 * | 11/2012 | Pereira | ..................... G06F 21/00 726/23 |
| 8,549,643 | B1 * | 10/2013 | Shou | ...................... G06F 21/556 455/410 |
| 8,578,493 | B1 * | 11/2013 | Cowan | .................. G06F 21/554 709/224 |
| 8,726,392 | B1 * | 5/2014 | McCorkendale | ....... G06F 21/56 713/188 |

(Continued)

OTHER PUBLICATIONS

Weissman, "Here's how long it takes for your personal information to travel across the Internet after it's stolen," http://www.businessinsider.com/bitglass-tracks-stolen-data-2015-4#ixzz3Y9253HSM, Apr. 7, 2015, 3 pages.

(Continued)

*Primary Examiner* — Morshed Mehedi
*Assistant Examiner* — Vadim Savenkov
(74) *Attorney, Agent, or Firm* — Harrity & Harrity, LLP

(57) ABSTRACT

A device may identify exfiltration information to be used to detect data exfiltration. The exfiltration information may be associated with a file being tested to determine whether the file exfiltrates data. The exfiltration information may include a resource identifier that identifies a resource to be used to detect the data exfiltration. The device may determine that the resource, to be used to detect the data exfiltration, has been accessed. The device may identify, based on determining that the resource has been accessed, the file associated with the exfiltration information. The device may perform an action, associated with the file, to counteract the data exfiltration based on determining that the resource has been accessed and based on identifying the file.

20 Claims, 10 Drawing Sheets

(56) References Cited

U.S. PATENT DOCUMENTS

| | | | |
|---|---|---|---|
| 8,769,679 B1* | 7/2014 | Lingafelt | G06F 21/552 713/176 |
| 8,826,452 B1* | 9/2014 | He | G06F 21/84 726/27 |
| 8,990,944 B1* | 3/2015 | Singh | G06F 21/56 726/24 |
| 9,262,630 B2* | 2/2016 | Sankararaman | G06F 21/554 |
| 9,565,202 B1* | 2/2017 | Kindlund | H04L 63/1441 |
| 9,626,509 B1* | 4/2017 | Khalid | G06F 21/56 |
| 9,736,182 B1* | 8/2017 | Madhukar | H04L 63/20 |
| 2003/0217284 A1* | 11/2003 | Sakata | G06F 21/556 726/3 |
| 2008/0016339 A1 | 1/2008 | Shukla | |
| 2009/0241173 A1* | 9/2009 | Troyansky | G06F 21/552 726/5 |
| 2009/0328216 A1* | 12/2009 | Rafalovich | H04L 63/1491 726/23 |
| 2012/0079596 A1 | 3/2012 | Thomas et al. | |
| 2012/0084866 A1* | 4/2012 | Stolfo | G06F 21/554 726/25 |
| 2012/0084868 A1* | 4/2012 | Julisch | G06F 21/6218 726/26 |
| 2012/0110174 A1* | 5/2012 | Wootton | G06F 21/564 709/224 |
| 2012/0222110 A1* | 8/2012 | Huang | H04L 43/028 726/22 |
| 2013/0133072 A1* | 5/2013 | Kraitsman | H04L 63/1408 726/23 |
| 2013/0227714 A1* | 8/2013 | Gula | G06F 21/64 726/32 |
| 2013/0347085 A1* | 12/2013 | Hawthorn | H04L 63/0823 726/6 |
| 2014/0007228 A1 | 1/2014 | Ngair | |
| 2014/0165137 A1* | 6/2014 | Balinsky | G06F 21/554 726/1 |
| 2014/0215617 A1 | 7/2014 | Smith et al. | |
| 2015/0242633 A1* | 8/2015 | Galil | G06F 21/552 726/1 |
| 2016/0112451 A1* | 4/2016 | Jevans | H04L 63/1408 726/25 |

OTHER PUBLICATIONS

Attivo Networks, "Attivo Networks," http://attivonetworks.com/, May 27, 2014, 1 page.

* cited by examiner

US 10,091,222 B1

DETECTING DATA EXFILTRATION AS THE DATA EXFILTRATION OCCURS OR AFTER THE DATA EXFILTRATION OCCURS

BACKGROUND

Data exfiltration is the unauthorized copying, transfer, or retrieval of data from a computer or server. Data exfiltration is a malicious activity performed through various different techniques, typically by cybercriminals over the Internet or another network. Data exfiltration may also be referred to as data extrusion, data exportation, or data theft.

SUMMARY

According to some possible implementations, a device may identify exfiltration information to be used to detect data exfiltration. The exfiltration information may be associated with a file being tested to determine whether the file exfiltrates data. The exfiltration information may include a resource identifier that identifies a resource to be used to detect the data exfiltration. The device may determine that the resource, to be used to detect the data exfiltration, has been accessed. The device may identify, based on determining that the resource has been accessed, the file associated with the exfiltration information. The device may perform an action, associated with the file, to counteract the data exfiltration based on determining that the resource has been accessed and based on identifying the file.

According to some possible implementations, a computer-readable medium may store one or more instructions that, when executed by one or more processors, cause the one or more processors to receive or generate exfiltration information to be used to detect data exfiltration. The exfiltration information may be associated with a file to be tested to determine whether the file exfiltrates the exfiltration information. The exfiltration information may include a resource identifier that identifies a resource to be used to detect the data exfiltration. The one or more instructions may cause the one or more processors to determine that the resource, to be used to detect the data exfiltration, has been accessed. The one or more instructions may cause the one or more processors to identify, based on determining that the resource has been accessed, the file associated with the exfiltration information. The one or more instructions may cause the one or more processors to perform an action to counteract the data exfiltration based on identifying the file.

According to some possible implementations, a method may include receiving, by a device, exfiltration information to be used to detect data exfiltration. The exfiltration information may be associated with a file being tested to determine whether the file exfiltrates data. The exfiltration information may include a resource identifier that identifies a resource to be used to detect the data exfiltration. The method may include determining, by the device, that the resource, to be used to detect the data exfiltration, has been accessed. The method may include identifying, by the device and based on determining that the resource has been accessed, the file associated with the exfiltration information. The method may include performing, by the device, an action to counteract the data exfiltration based on determining that that the resource has been accessed and based on identifying the file.

DETAILED DESCRIPTION

The following detailed description of example implementations refers to the accompanying drawings. The same reference numbers in different drawings may identify the same or similar elements.

Malicious users may exfiltrate sensitive information stored by a computing device, such as a server, a personal computer, or the like. For example, a user, who is a target of a malware attack, may download a data exfiltration malware application onto a client device (e.g., a computer, a mobile phone, etc.), and the application may obtain and transmit (e.g., may exfiltrate) sensitive information, stored by the client device, to a device used by the malicious user. In some cases, the client device or a security device (e.g., a firewall, a gateway, etc.) may detect data exfiltration by monitoring outbound traffic for sensitive information. In this way, data exfiltration may be detected when the data is being exfiltrated (e.g., when the data is being transmitted from the client device). However, in some cases, the malware application may encrypt the exfiltrated data, making it difficult to detect data exfiltration by monitoring outbound traffic. Implementations described herein are capable of detecting data exfiltration when the data is being exfiltrated, and also at a later point in time when the exfiltrated data is used and/or accessed (e.g., after the data has been exfiltrated). This provides greater protection from data exfiltration.

Figure 1:
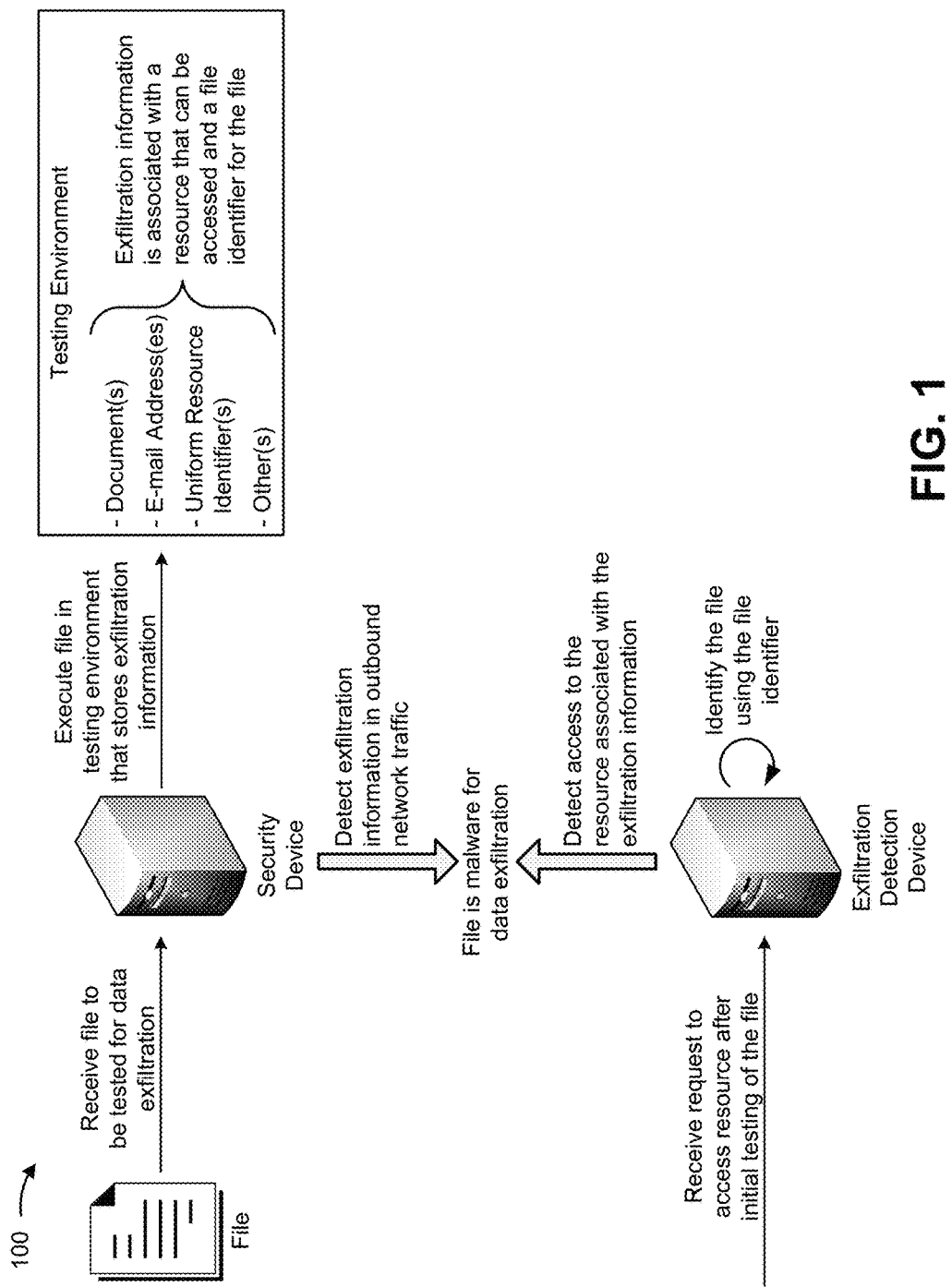
FIG. 1 is a diagram of an overview of an example implementation described herein.

FIG. 1 is a diagram of an overview of an example implementation 100 described herein. As shown in FIG. 1, assume that a security device receives a file to be tested for data exfiltration. As further shown, assume that the security device executes the file in a testing environment that stores exfiltration information. The exfiltration information may identify a resource that, when accessed, indicates that data exfiltration has occurred. For example, the exfiltration information may include a document that includes program code (e.g., a script) that accesses a resource, an email address that may be used to access a resource, a uniform resource identifier (URI) that may be used to access a resource, or the like. Furthermore, the exfiltration information may be associated with a file identifier that identifies the file, such that the file that exfiltrated the data can be identified when the resource is accessed.

As further shown in FIG. 1, the security device may detect data exfiltration by detecting that the exfiltration information (e.g., a document, an email address, a URI, etc.) is included in outbound network traffic (e.g., as plaintext). In this way, the security device may detect data exfiltration as the data exfiltration occurs. However, in some cases, the security device may not be capable of detecting data exfiltration as the data exfiltration occurs, such as when the exfiltrated data is encrypted. In this case, an exfiltration detection device (e.g., a server or a similar device) may detect data exfiltration after the data exfiltration has occurred.

For example, and as shown, the exfiltration detection device may receive a request to access a resource, identified in the exfiltration information that was exfiltrated by the file, after initial testing of the file in the testing environment of the security device. In this case, the exfiltration detection device may detect data exfiltration by determining that the resource was accessed. Furthermore, since the exfiltration information includes a file identifier that identifies the file, the exfiltration detection device may identify the file using the file identifier. In this way, the security device and/or the exfiltration detection device may determine whether a file is a data exfiltration malware application when data exfiltration occurs and/or after data exfiltration occurs, thereby increasing the likelihood that data exfiltration is detected, and improving security of stored information.

Figure 2:
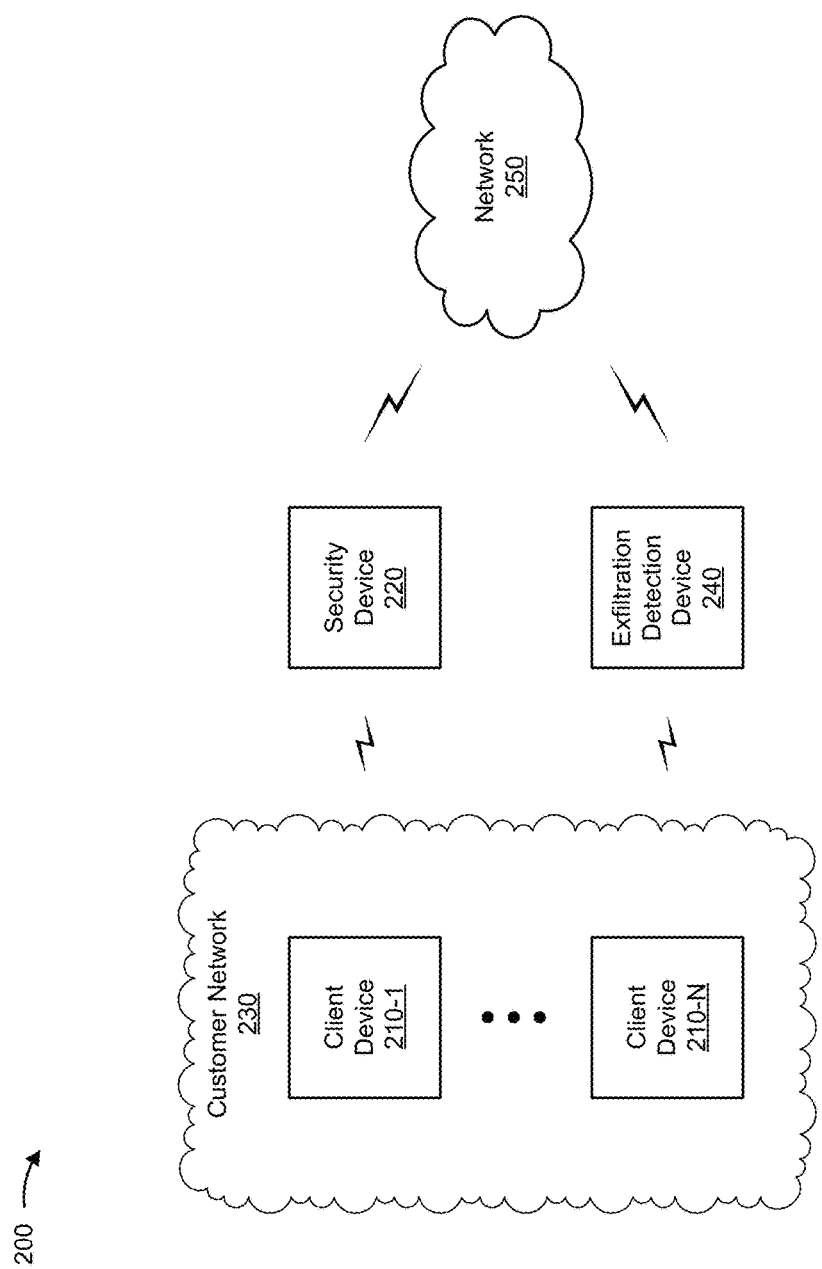
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a security device 220, a customer network 230, an exfiltration detection device 240, and a network 250. Devices of environment 200 may interconnect via wired connections, wireless connections, or a combination of wired and wireless connections.

Client device 210 may include one or more devices capable of storing information that may be exfiltrated by a data exfiltration malware application. For example, client device 210 may include a desktop computer, a laptop computer, a tablet computer, a mobile phone (e.g., a smart phone, a radiotelephone, etc.), a server, or a similar type of device. In some implementations, client device 210 may store sensitive information, such as credit card information, bank information, personal information, company information, or the like. In some implementations, client device 210 may reside on customer network 230.

Security device 220 may include one or more devices capable of processing and/or transferring network traffic associated with client device 210, and/or capable of providing a security service (e.g., a data exfiltration detection service) for client device 210 and/or customer network 230. For example, security device 220 may include a gateway, a firewall, a router, a bridge, a hub, a switch, a load balancer, an access point, a reverse proxy, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. For example, security device 220 may be positioned within a network as a gateway to customer network 230 that includes the group of client devices 210. Additionally, or alternatively, communications from client devices 210 may be encoded such that the communications are routed to security device 220 before being routed elsewhere.

In some implementations, security device 220 may detect data exfiltration (e.g., as the data exfiltration occurs). For example, security device 220 may monitor a file requested by and/or provided to client device 210 (e.g., before the file is provided to client device 210, after the file is provided to client device 210, etc.) to detect whether the file exfiltrates data. In some implementations, security device 220 may execute the file in a testing environment (e.g., a sandbox environment), and may detect whether the file exfiltrates data from the testing environment.

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, customer network 230 may be a private network associated with client devices 210.

Exfiltration detection device 240 may include one or more devices capable of processing and/or transferring network traffic associated with client device 210, and/or capable of providing a security service (e.g., a data exfiltration detection service) for client device 210 and/or customer network 230. For example, exfiltration detection device 240 may include a gateway, a firewall, a router, a bridge, a hub, a switch, a load balancer, a reverse proxy, a server (e.g., a proxy server), or a similar type of device. In some implementations, exfiltration detection device 240 may detect data exfiltration (e.g., after the data exfiltration occurs). For example, exfiltration detection device 240 may detect access to a resource, such as a resource stored by exfiltration detection device 240. Access to the resource may indicate that data exfiltration has occurred. Exfiltration detection device 240 may identify a file, associated with the resource access, that has exfiltrated data. In some implementations, exfiltration detection device 240 and security device 220 may be implemented within a single device.

Network 250 may include one or more wired and/or wireless networks. For example, network 250 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks. In some implementations, security device 220 and/or exfiltration detection device 240 may monitor a file, requested by client device 210 from a device (e.g., a server) associated with network 250, to detect whether the file exfiltrates data.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, security device 220 and exfiltration detection device 240 may be the same device. Additionally, or alternatively, security device 220 and/or exfiltration detection device 240 may be implemented within client device 210. Additionally, or alternatively, a set of devices (e.g., one or more devices) of environment 200 may perform one or more functions described as being performed by another set of devices of environment 200.

Figure 3:
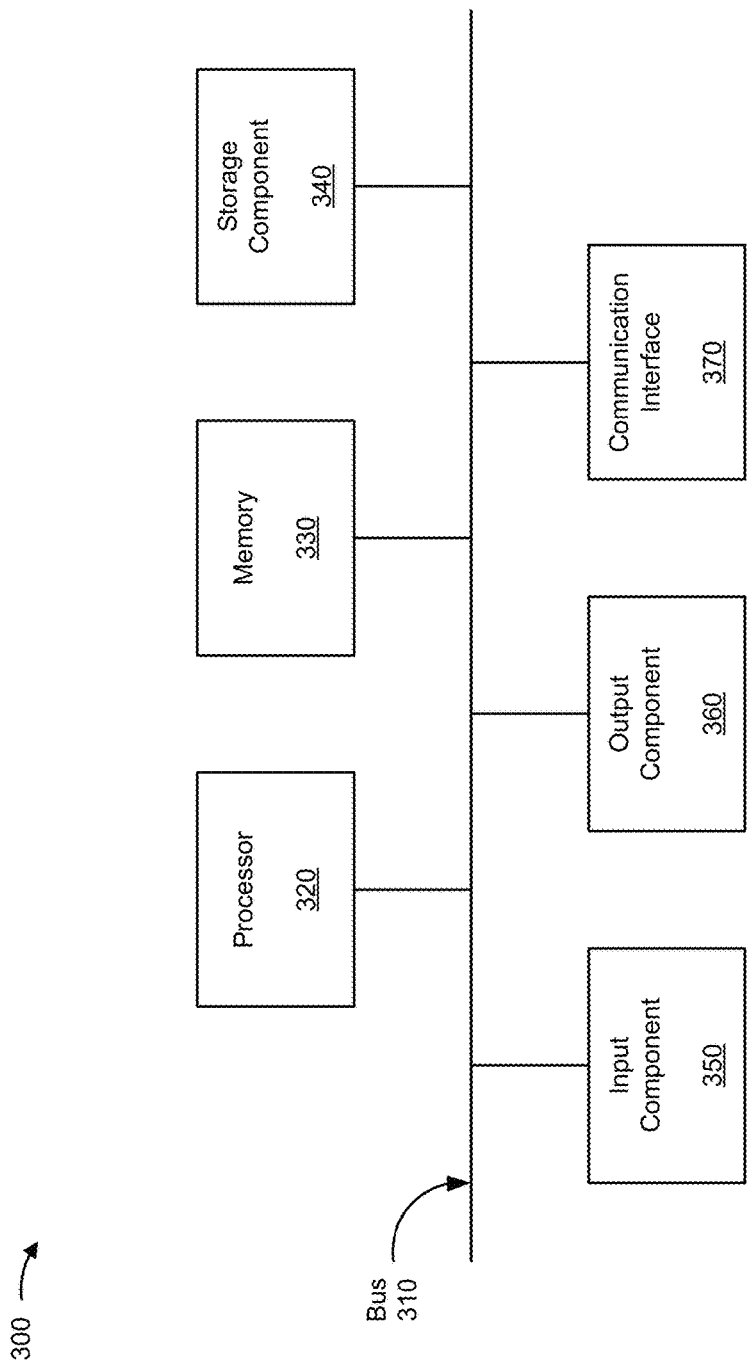
FIG. 3 is a diagram of example components of one or more devices of FIG. 2.

FIG. 3 is a diagram of example components of a device 300. Device 300 may correspond to client device 210, security device 220, and/or exfiltration detection device 240.

In some implementations, client device 210, security device 220, and/or exfiltration detection device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
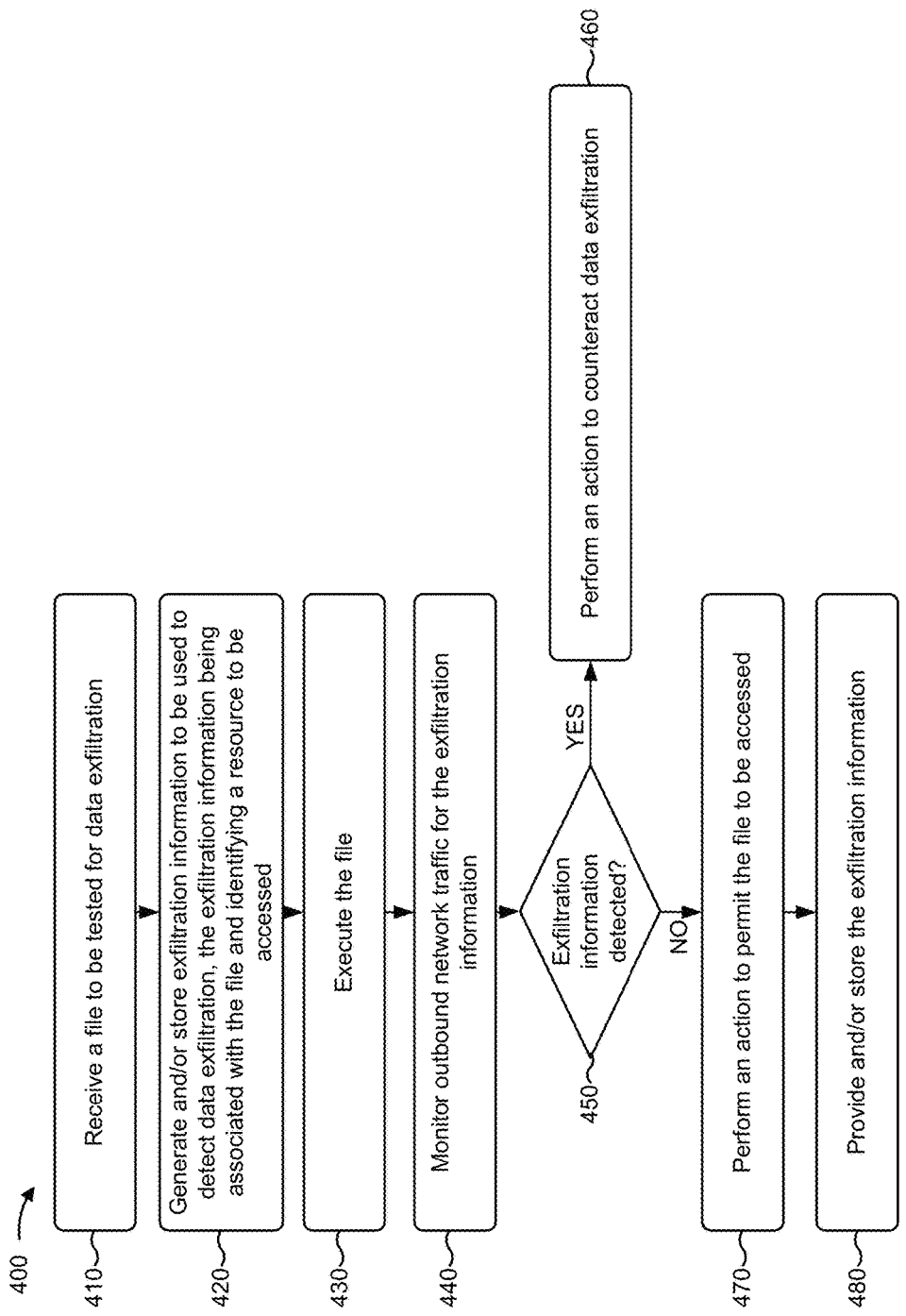
FIG. 4 is a flow chart of an example process for detecting data exfiltration as the data exfiltration occurs.

FIG. 4 is a flow chart of an example process 400 for detecting data exfiltration as the data exfiltration occurs. In some implementations, one or more process blocks of FIG. 4 may be performed by security device 220. In some implementations, one or more process blocks of FIG. 4 may be performed by another device or a set of devices separate from or including security device 220, such as client device 210 and/or exfiltration detection device 240.

As shown in FIG. 4, process 400 may include receiving a file to be tested for data exfiltration (block 410). For example, security device 220 may receive a file (e.g., an executable file, an application, a program, etc.) to be tested for data exfiltration. In some implementations, the file may be associated with client device 210 (e.g., may be stored by client device 210, may be executing on client device 210, may be requested by client device 210, etc.). As an example, client device 210 may request a file (e.g., from a website, via an email link, etc.), and security device 220 may receive and/or test the file before the file is provided to client device 210. In some implementations, security device 220 may test the file in a testing environment, such as a sandbox environment.

As further shown in FIG. 4, process 400 may include generating and/or storing exfiltration information to be used to detect data exfiltration, the exfiltration information being associated with the file and identifying a resource to be accessed (block 420). For example, security device 220 may generate and/or store exfiltration information to be used to detect data exfiltration. The exfiltration information may identify a resource (e.g., using a resource identifier) that, when accessed, indicates that data has been exfiltrated. In some implementations, security device 220 may provide the exfiltration information to exfiltration detection device 240 to permit exfiltration detection device 240 to create the resource to be accessed. In this way, exfiltration detection device 240 may use the resource to detect data exfiltration after the data exfiltration has occurred, as described in more detail elsewhere herein.

As an example, the resource identifier may include an email address (e.g., associated with a mail server that, when accessed, indicates data exfiltration), a uniform resource identifier (URI) (e.g., a uniform resource locator (URL) that identifies a website, a URI that identifies a file transfer protocol (FTP) resource, a URI that identifies a hypertext transfer protocol (HTTP) resource, a URI that identifies a file, etc.), a phone number (e.g., associated with a voice over Internet protocol (VoIP) phone that, when called, indicates that data has been exfiltrated), a device identifier (e.g., a network address, such as an Internet protocol (IP) address, that identifies a device that, when accessed, indicates data exfiltration), a port identifier (e.g., a port number that identifies a port of a device that, when accessed, indicates data exfiltration), a social media message endpoint identifier (e.g., that identifies a resource where social media messages may be sent), or the like. Additionally, or alternatively, the exfiltration information may include program code (e.g., a script, or the like) that, when executed, causes a resource to be accessed to indicate that data has been exfiltrated. The program code may include a resource identifier that identifies the resource. Additionally, or alternatively, the exfiltration information may include a sequence of keystrokes (e.g., emulated by security device 220), a sequence of characters, a sequence of input events (e.g., different types of mouse clicks, etc.) that are input while the testing environment is executed.

Additionally, or alternatively, the exfiltration information may include information designed to appear to be sensitive information. For example, the exfiltration information may include information designed to look like a credential (e.g., a username, a password, a personal identification number (PIN), etc.), a credit card number, a bank account number, confidential company information, personal information (e.g., a name, address, date of birth, social security number, etc.), or the like. In this way, security device 220 may increase the likelihood of data exfiltration.

In some implementations, the resource may be associated with and/or stored by exfiltration detection device 240. In this way, when the resource is accessed, exfiltration detection device 240 may detect that data exfiltration has occurred, as described in more detail elsewhere herein.

In some implementations, security device 220 may store the exfiltration information in a testing environment (e.g., associated with a virtual machine) of security device 220. Additionally, or alternatively, security device 220 may store the exfiltration information using a stored document (e.g., a text document, a word processing document, a spreadsheet document, a portable document format (PDF) document, etc.), using a stored credential (e.g., stored using a browser, stored using an operating system, etc.), using a stored URI (e.g., using a web browser history, a web browser bookmark, a web browser favorite, etc.), using a stored application (e.g., stored in a most recently used application history, a favorite application, an administrator application, etc.), using contact information (e.g., an address book), using a system file (e.g., an operating system host file, an administrator file, etc.), or the like.

The exfiltration information may be associated with the file that was received for testing by security device 220. In some implementations, the exfiltration information may include a file identifier that identifies the file. For example, the exfiltration information may be encoded with a file identifier that identifies the file, such as a hash value of the file (e.g., generated by applying a hash algorithm to the file), a file name of the file, or the like. As an example, executing program code included in a document with exfiltration information may cause a file identifier to be sent to exfiltration detection device 240. As another example, the file identifier may be included in an email address, a URI, a social media message endpoint identifier, or the like. In some implementations, security device 220 may apply steganography to obfuscate the file identifier. For example, security device 220 may select random words (e.g., from a stored dictionary), corresponding to each letter of the file name, and may generate the file identifier based on the random words (e.g., by concatenating the random words).

Additionally, or alternatively, security device 220 (or another device) may store, in a data structure, a relationship indicator that indicates a relationship between the exfiltration information (and/or a resource identifier included in the exfiltration information) and the file. In this way, exfiltration detection device 240 may use the exfiltration information and/or the resource identifier to identify the file that exfiltrated the exfiltration information, as described in more detail elsewhere herein.

In some implementations, exfiltration information may be generated and/or stored by client device 210. For example, client device 210 may store exfiltration information (e.g., at the instruction of security device 220) in a location in which a user of client device 210 is unlikely to access the exfiltration information (e.g., in a system folder, in a registry file, in a recycling bin, etc.).

As further shown in FIG. 4, process 400 may include executing the file (block 430), and monitoring outbound network traffic for the exfiltration information (block 440). For example, security device 220 may execute the file (e.g., in the testing environment). After executing the file, security device 220 may monitor outbound network traffic (e.g., traffic that leaves security device 220 and/or the testing environment). In some implementations, security device 220 may monitor outbound network traffic for a threshold amount of time (e.g., one minute, five minutes, ten minutes, thirty minutes, one hour, one day, etc.).

As further shown in FIG. 4, process 400 may include determining whether the exfiltration information is detected in the outbound network traffic (block 450). For example, security device 220 may monitor outbound network traffic to detect whether the outbound network traffic includes the exfiltration information (e.g., a resource identifier, information designed to appear to be sensitive information, etc.). In some implementations, security device 220 may monitor outbound network traffic for plaintext that matches text of the exfiltration information (e.g., text corresponding to a resource identifier, text corresponding to sensitive information, etc.).

As further shown in FIG. 4, if the exfiltration information is detected in the outbound network traffic (block 450— YES), then process 400 may include performing an action to counteract data exfiltration (block 460). For example, if security device 220 detects the exfiltration information in the outbound network traffic, then security device 220 may perform an action to counteract data exfiltration. In some implementations, security device 220 may counteract data exfiltration by identifying the file as suspicious. In this case, security device 220 may store a malware indicator, in association with the file, that indicates that the file is suspicious (e.g., is malware). In this way, security device 220 and/or another device may use the malware indicator to identify the file as malware, and may perform an action to counteract the malware.

Additionally, or alternatively, security device 220 may counteract data exfiltration by identifying the file (e.g., in memory) and deleting the file from memory. In this way, security device 220 may prevent the file from exfiltrating data.

As another example, assume that client device 210 requests the file from a device associated with network 250 (e.g., a web server, a host server, etc.). In this case, security device 220 may receive the request, may request the file from the device, may receive the file from the device, and may detect whether the file exfiltrates data before sending the file to client device 210. If security device 220 determines that the file exfiltrates data (e.g., based on performing one or more of the operations described in connection with blocks 410-450), security device 220 may counteract data exfiltration by preventing the file from being provided to client device 210. If security device 220 determines that the file does not exfiltrate data, then security device 220 may provide the file to client device 210. In this way, security device 220 may prevent a malicious file from exfiltrating data.

In some implementations, if security device 220 determines that the file exfiltrates data, then security device 220 may counteract data exfiltration by monitoring the file (e.g., by monitoring communications sent by the file) to identify a device to which exfiltration information is being sent (e.g., to identify a command and control server). In this case, security device 220 may block communications associated with the device, may provide an instruction to client device 210 and/or another device associated with customer network 230 (e.g., a firewall, a router, a gateway, etc.) to block communications associated with the device (e.g., to block communications to and/or from the device), or the like. In this way, security device 220 may prevent a malicious file from exfiltrating data.

Additionally, or alternatively, security device 220 may provide a notification that identifies client devices 210 that are communicating with the device (e.g., the command and control server) to identify and protect these client devices 210. In this way, security device 220 may protect client devices 210, of customer network 230, from security threats.

As further shown in FIG. 4, if the exfiltration information is not detected in the outbound network traffic (block 450—NO), then process 400 may include performing an action to permit the file to be accessed (block 470). For example, if security device 220 does not detect the exfiltration information in the outbound network traffic (e.g., after monitoring the outbound network traffic for a threshold amount of time), then security device 220 may perform an action to permit the file to be accessed. In some implementations, security device 220 may permit the file to be accessed by identifying the file as unsuspicious. In this case, security device 220 may store a malware indicator, in association with the file, that indicates that the file is unsuspicious (e.g., is not malware).

As another example, assume that client device 210 requests the file from a device associated with network 250 (e.g., a web server, a host server, etc.). In this case, security device 220 may receive the request, may request the file from the device, may receive the file from the device, and may detect whether the file exfiltrates data before sending the file to client device 210. If security device 220 determines that the file does not exfiltrate data (e.g., based on performing one or more of the operations described in connection with blocks 410-450), security device 220 may permit the file to be accessed by providing the file to client device 210. In this way, security device 220 may protect client devices 210, of customer network 230, from security threats.

In some implementations, security device 220 may not detect the exfiltration information in the outbound network traffic because the exfiltration information has been encrypted before being transmitted. Additionally, or alternatively, security device 220 may not detect the exfiltration information in the outbound network traffic because the file transmits the exfiltration information after the threshold amount of time for monitoring outbound network traffic has elapsed. As described in more detail elsewhere herein, security device 220 and/or exfiltration detection device 240 may still detect data exfiltration in these cases by detecting the data exfiltration after the data exfiltration has occurred.

As further shown in FIG. 4, process 400 may include providing and/or storing the exfiltration information (block 480). For example, security device 220 may store the exfiltration information (e.g., in a memory local to security device 220), and/or may provide the exfiltration information to another device, such as exfiltration detection device 240. In some implementations, security device 220 may store the exfiltration information and/or provide the exfiltration information to exfiltration detection device 240 when the exfiltration information is generated, as described above in connection with block 420. Additionally, or alternatively, security device 220 may store the exfiltration information and/or provide the exfiltration information to exfiltration detection device 240 after failing to detect the exfiltration information in the outbound network traffic. In this way, security device 220 may conserve computing resources (e.g., memory) and/or network resources by only providing the exfiltration information, for detection of data exfiltration, if security device 220 fails to detect data exfiltration.

Security device 220 and/or exfiltration detection device 240 may use the exfiltration information to create a resource accessible to detect data exfiltration, as described in more detail in connection with FIG. 6. In this way, security device 220 may detect data exfiltration as the data exfiltration occurs. Furthermore, and as described in more detail in connection with FIG. 6, security device 220 and/or exfiltration detection device 240 may continue to monitor a resource, associated with the exfiltration information, to determine whether the resource has been accessed. When the resource is accessed, this may indicate that data has been exfiltrated. In this way, security device 220 and/or exfiltration detection device 240 may detect data exfiltration as the data exfiltration occurs and/or after the data exfiltration occurs (e.g., when the exfiltrated data is accessed or used).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
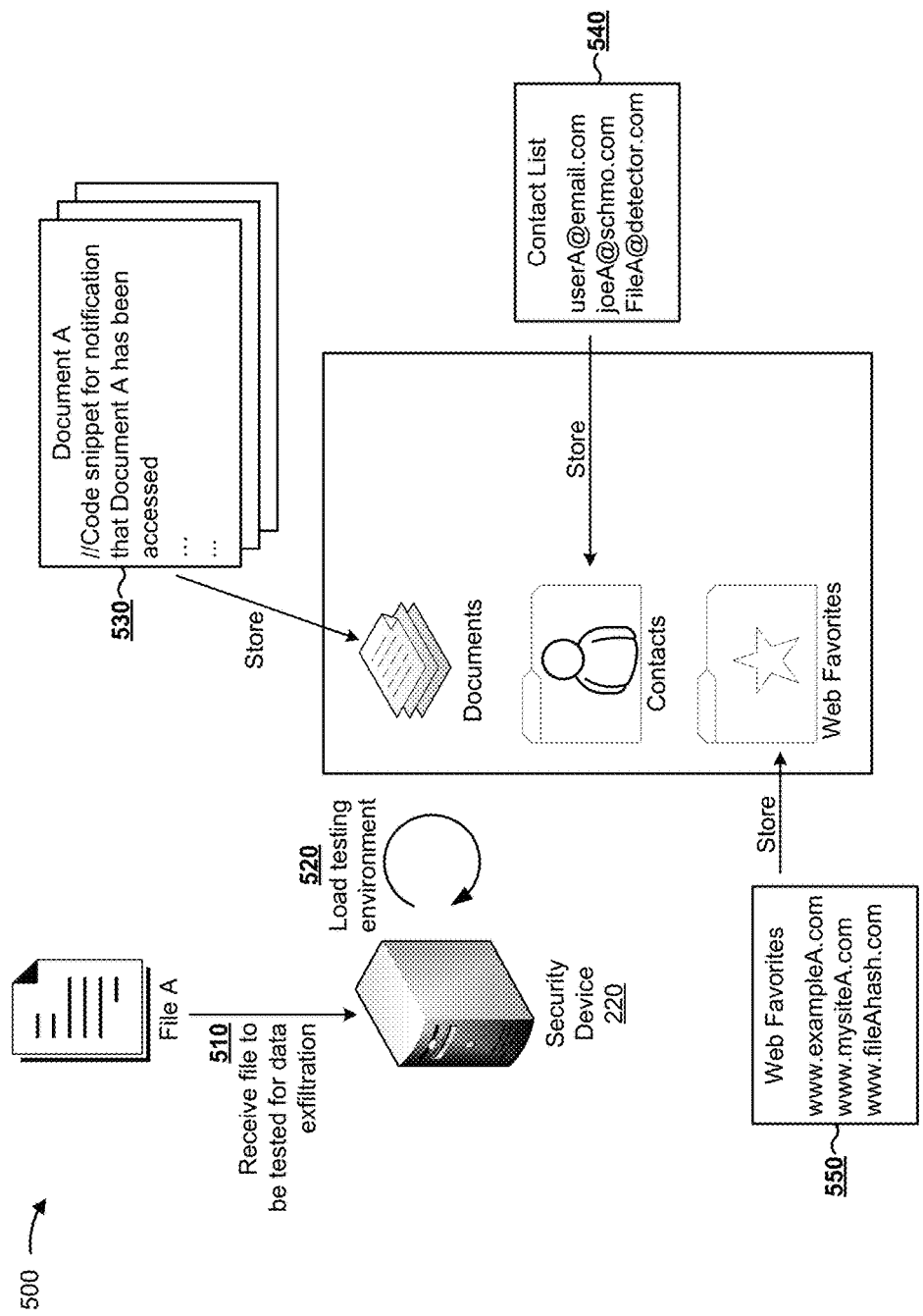
FIGS. 5A and 5B are diagrams of an example implementation relating to the example process shown in FIG. 4.
Figure 5B:
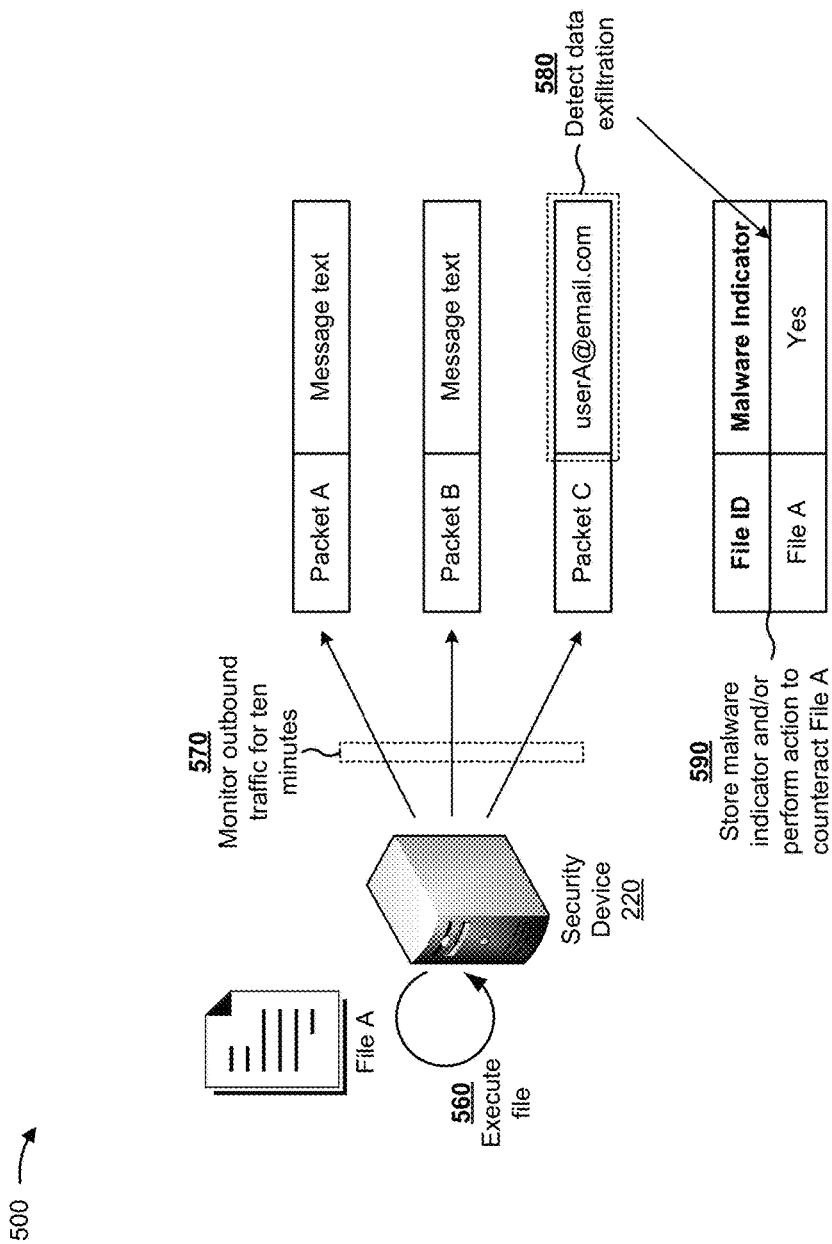

FIGS. 5A and 5B are diagrams of an example implementation 500 relating to example process 400 shown in FIG. 4. FIGS. 5A and 5B show an example of detecting data exfiltration as the data exfiltration occurs.

As shown in FIG. 5A, and by reference number 510, assume that security device 220 receives a file, shown as "File A," to be tested for data exfiltration. Based on receiving File A, assume that security device 220 loads a testing environment for testing File A, as shown by reference number 520. As further shown, security device 220 may store exfiltration information in the testing environment. For example, and as shown by reference number 530, security device 220 may store a document, shown as "Document A," in a documents folder of the testing environment. The document, when opened, may cause execution of a code snippet that accesses a resource, indicating that Document A has been accessed (e.g., by a malicious user). In other words, Document A may access a resource (e.g., by sending a message to the resource), and may include a file identifier that identifies File A. The file identifier may be included in the notification to identify that File A exfiltrated data.

As another example, and as shown by reference number 540, security device 220 may store email addresses in a contact list. When a message is sent to one of the email addresses, this may indicate that data exfiltration has occurred (e.g., exfiltration of an email address). Security device 220 may generate the email addresses to include a file identifier that identifies file A (e.g., userA@email.com, joeA@schmo.com, FileA@detector.com, etc.). In this way, when an email message is received at a particular email address, a device that received the email message (e.g., exfiltration detection device 240) can correlate the email address to the file that exfiltrated data.

As another example, and as shown by reference number 550, security device 220 may store a list of URLs in a web favorites folder. When access to one of the URLs is requested, this may indicate that data exfiltration has occurred (e.g., exfiltration of a URL). Security device 220 may generate the URL to include a file identifier that identifies file A (e.g., www.exampleA.com, www.mysiteA.com, www.fileAhash.com, etc.). In this way, when a request to access a resource identified by the URL is received, a device that received the request (e.g., exfiltration detection device 240) can correlate the URL to the file that exfiltrated data.

As shown in FIG. 5B, assume that after loading the testing environment and storing the generated exfiltration information, security device 220 executes File A, as shown by reference number 560. After executing File A, assume that security device 220 monitors outbound traffic for ten minutes, as shown by reference number 570. For example, assume that security device 220 reads packet information included in packets shown as "Packet A," "Packet B," and "Packet C." As shown by reference number 580, assume that Packet C includes the plaintext "userA@email.com," which corresponds to an email address stored in the testing environment. As shown by reference number 590, based on detecting this data exfiltration, assume that security device 220 stores a malware indicator that indicates that File A is malware (e.g., is a data exfiltration malware application). Additionally, or alternatively, security device 220 may perform an action to counteract File A, such as preventing a client device 210 that requested File A from receiving File A.

As indicated above, FIGS. 5A and 5B are provided merely as an example. Other examples are possible and may differ from what was described with regard to FIGS. 5A and 5B.

Figure 6A:
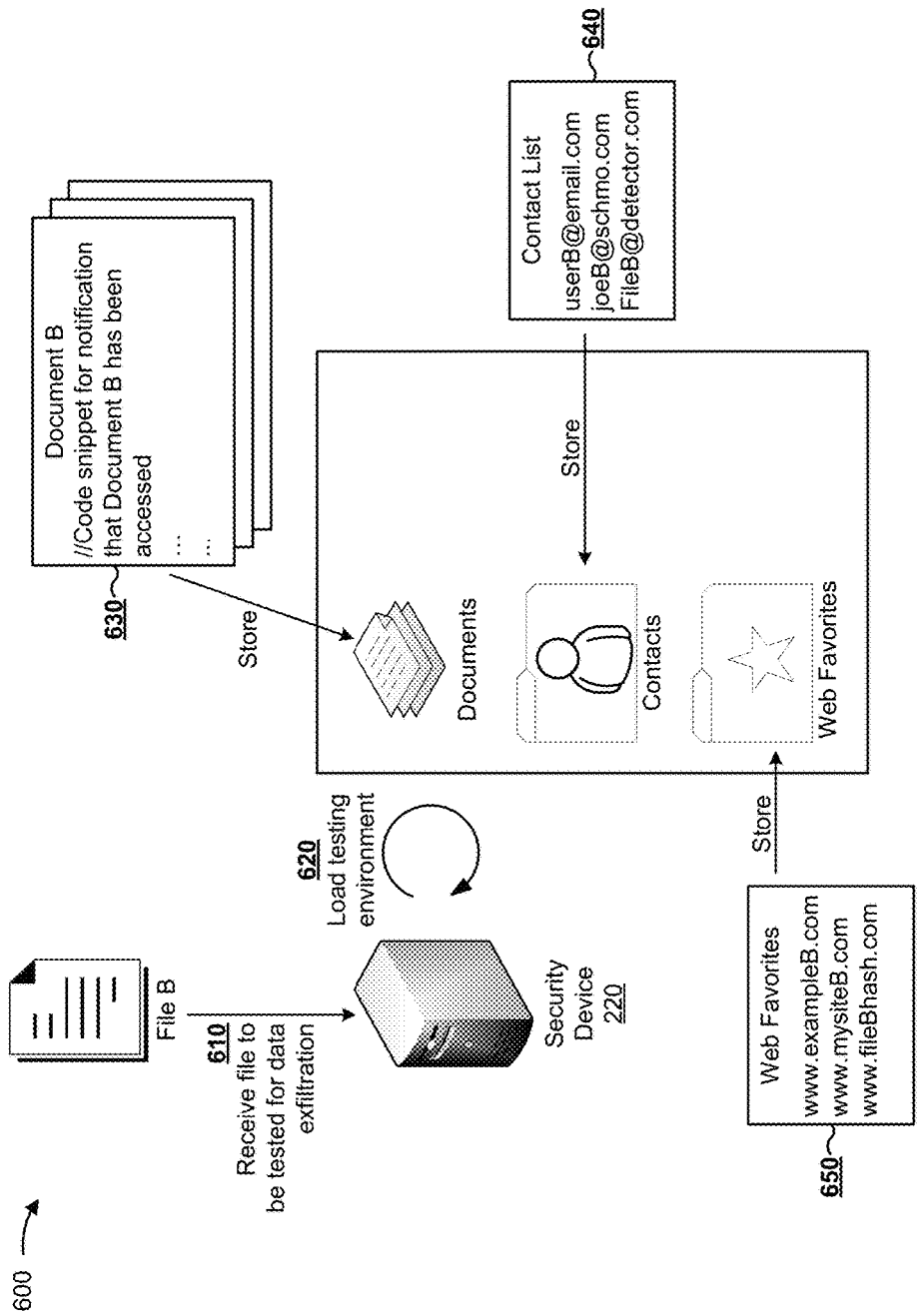
FIGS. 6A and 6B are diagrams of another example implementation relating to the example process shown in FIG. 4.
Figure 6B:
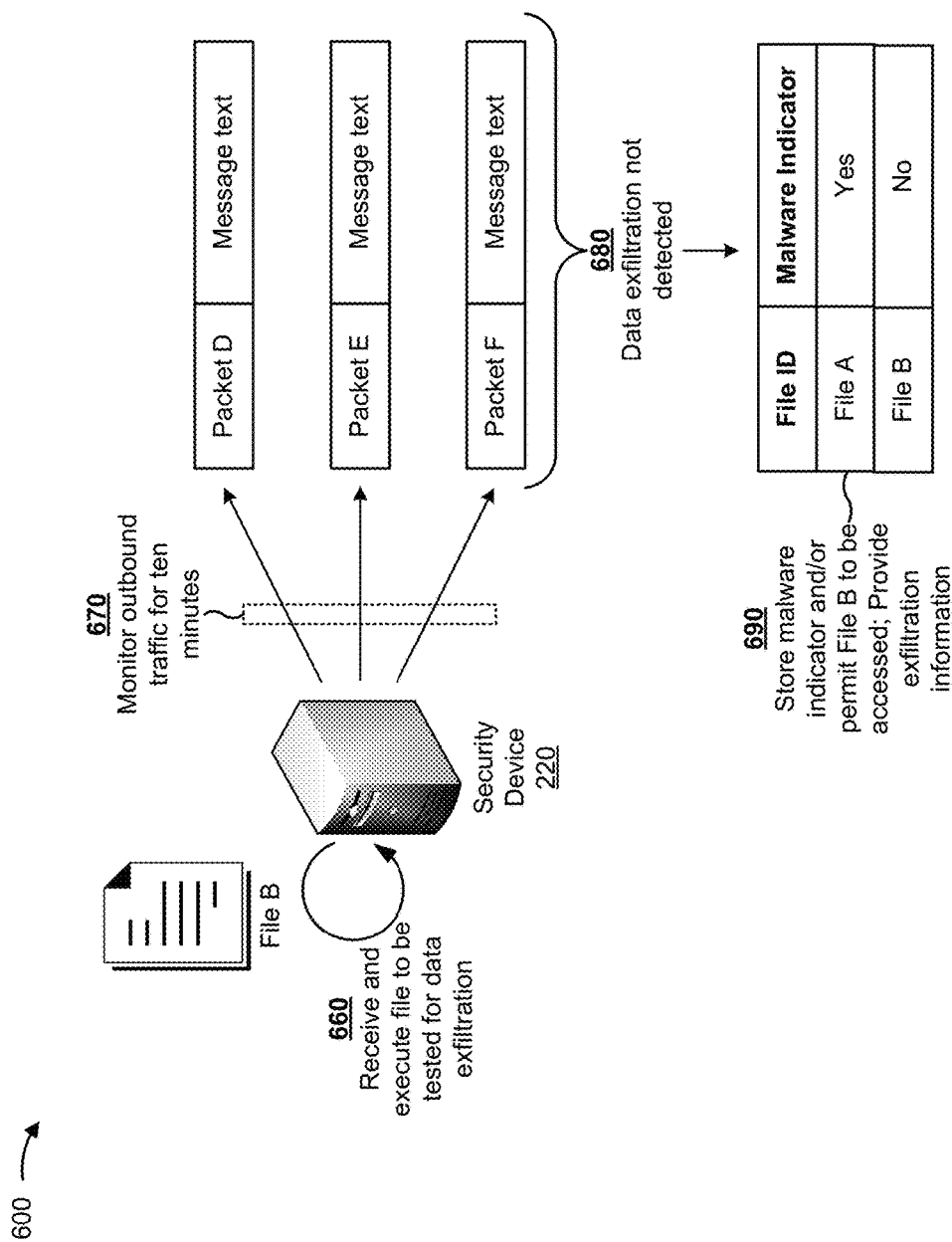

FIGS. 6A and 6B are diagrams of another example implementation 600 relating to example process 400 shown in FIG. 4. FIGS. 6A and 6B show an example of failing to detect data exfiltration as the data exfiltration occurs, and sending exfiltration information to another device for detecting data exfiltration after the data exfiltration occurs.

As shown in FIG. 6A, and by reference number 610, assume that security device 220 receives a file, shown as "File B," to be tested for data exfiltration. Based on receiving File B, assume that security device 220 loads a testing environment for testing File B, as shown by reference number 620. As further shown, security device 220 may store exfiltration information in the testing environment. For example, and as shown by reference number 630, security device 220 may store a document (e.g., Document B) that, when accessed, causes execution of a code snippet that accesses a resource, indicating that File B has exfiltrated data (e.g., the document). As another example, and as shown by reference number 640, security device 220 may store email addresses (e.g., userB@email.com, joeB@schmo.com, FileB@detector.com, etc.) that, when used to access a resource, indicate that File B has exfiltrated data (e.g., the email addresses). As another example, and as shown by reference number 650, security device 220 may store a list of URLs (e.g., www.exampleB.com, www.mysiteB.com, www.fileBhash.com, etc.) that, when used to access a resource, indicate that File B has exfiltrated data (e.g., the URLs).

As shown in FIG. 6B, assume that after loading the testing environment and storing the generated exfiltration information, security device 220 executes File B, as shown by reference number 660. After executing File B, assume that security device 220 monitors outbound traffic for ten minutes, as shown by reference number 670. For example, assume that security device 220 reads packet information included in packets shown as "Packet D," "Packet E," and "Packet F." As shown by reference number 680, assume that security device 220 fails to detect data exfiltration by monitoring the outbound network traffic. For example, security device 220 may fail to detect data exfiltration because data exfiltration did not occur, because the network traffic was encrypted or otherwise obscured, or because the data exfiltration occurred after security device 220 stopped monitoring the network traffic. As shown by reference number 690, based on failing to detect data exfiltration, assume that security device 220 stores a malware indicator that indicates that File B is not malware (e.g., is not a data exfiltration malware application). Additionally, or alternatively, security device 220 may permit File B to be accessed (e.g., by client device 210). Furthermore, assume that security device 220 provides the generated exfiltration information to exfiltration detection device 240, which may use the exfiltration information to detect data exfiltration, as described in more detail below.

As indicated above, FIGS. 6A and 6B are provided merely as an example. Other examples are possible and may differ from what was described with regard to FIGS. 6A and 6B.

Figure 7:
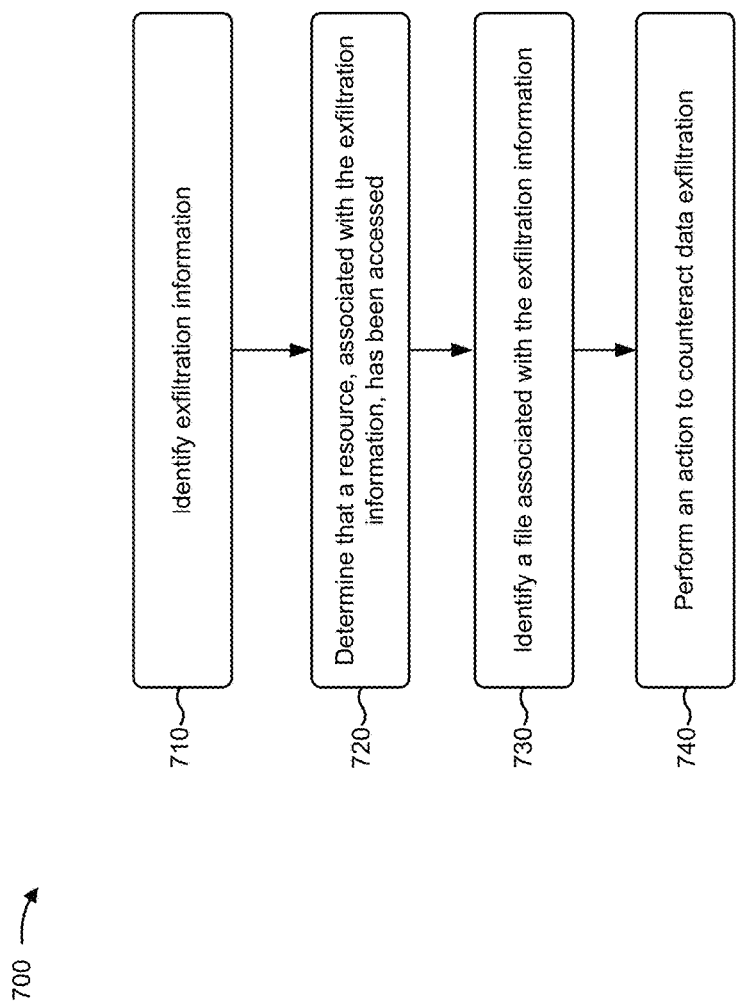
FIG. 7 is a flow chart of an example process for detecting data exfiltration after the data exfiltration occurs.

FIG. 7 is a flow chart of an example process 700 for detecting data exfiltration after the data exfiltration occurs. In some implementations, one or more process blocks of FIG. 7 may be performed by exfiltration detection device 240. In some implementations, one or more process blocks of FIG. 7 may be performed by another device or a set of devices separate from or including exfiltration detection device 240, such as client device 210 and/or security device 220.

As shown in FIG. 7, process 700 may include identifying exfiltration information (block 710). For example, exfiltration detection device 240 may identify the exfiltration information by receiving the exfiltration information (e.g., from security device 220) and/or by generating the exfiltration information (e.g., when security device 220 and exfiltration detection device 240 are implemented within a single device). In some implementations, exfiltration detection device 240 may receive the exfiltration information (e.g., from security device 220) when the exfiltration information is generated by security device 220. Additionally, or alternatively, exfiltration detection device 240 may receive the exfiltration information (e.g., from security device 220) after security device 220 fails to detect the exfiltration information in outbound network traffic.

Exfiltration detection device 240 may use the exfiltration information to create a resource accessible to detect data exfiltration. For example, the exfiltration information may include a resource identifier that identifies a resource, and exfiltration detection device 240 may create the identified resource to permit the identified resource to be accessed based on exfiltrated data (e.g., when the exfiltration information is exfiltrated and used). As an example, the resource identifier may include an email address, and exfiltration detection device 240 may generate a mail server (e.g., a virtual mail server) accessible via the email address (e.g., a message may be sent to the email address). As another example, the resource identifier may include a URI, and exfiltration detection device 240 may generate a resource accessible via the URI (e.g., a website, a webpage, or the like).

As further shown in FIG. 7, process 700 may include determining that a resource, associated with the exfiltration information, has been accessed (block 720). For example, exfiltration detection device 240 may determine that a resource has been accessed (e.g., a resource associated with program code, an email address, a URI, a phone number, a device identifier, a port identifier, a social media message endpoint identifier, etc.). In some implementations, the resource may be stored by and/or accessible via exfiltration detection device 240. Because the resource is identified by a resource identifier included in exfiltration information used to test whether a file has exfiltrated data, access to the resource may indicate that the exfiltration information has been exfiltrated, and that the file is malware (e.g., a data exfiltration malware application).

As further shown in FIG. 7, process 700 may include identifying a file associated with the exfiltration information (block 730). For example, exfiltration detection device 240 may use the exfiltration information to identify a file that exfiltrated the exfiltration information. In some implementations, the exfiltration information may include a file identifier that identifies the file. For example, the resource identifier may include the file identifier (e.g., a hash value generated by applying a hash algorithm to the file, a file name, etc.). In some implementations, exfiltration detection device 240 may decode the file identifier (e.g., a hash value) to identify the file.

Additionally, or alternatively, exfiltration detection device 240 may search a data structure, using the exfiltration information (e.g., a resource identifier included in the exfiltration information) to identify the file. As an example, the data structure may store a relationship indicator that indicates a relationship between a resource identifier and the file. When a resource, identified by the resource identifier, is accessed, exfiltration detection device 240 may use the data structure to identify a file that shares a relationship with the resource identifier (e.g., based on a relationship indicator). In some implementations, exfiltration detection device 240 may store the data structure. Additionally, or alternatively, another device (e.g., security device 220) may store the data structure.

As further shown in FIG. 7, process 700 may include performing an action to counteract data exfiltration (block 740). For example, if exfiltration detection device 240 detects that the resource has been accessed, then exfiltration detection device 240 may perform an action to counteract data exfiltration, as described above in connection with block 460 of FIG. 4. In some implementations, exfiltration detection device 240 may counteract data exfiltration by identifying the file as suspicious (e.g., using a malware indicator). In this case, the file may have previously been identified as unsuspicious due to a failure by security device 220 to detect the data exfiltration. As such, exfiltration detection device 240 may update a stored malware indicator, associated with the file, from an indication that the file is unsuspicious to an indication that the file is suspicious. In this way, security device 220 and/or another device may use the malware indicator to identify the file as malware, and may perform an action to counteract the suspicious file.

Additionally, or alternatively, exfiltration detection device 240 may counteract data exfiltration by providing a notification to client device(s) 210 that received the file (e.g., due to the file being identified as unsuspicious). The notification may indicate that the file is malware, and may cause client device(s) 210 to perform an action to counteract the file (e.g., delete the file, prevent the file from sending messages, etc.). In this case, security device 220 and/or exfiltration detection device 240 may store information that identifies client device(s) 210 to which the file has been provided, and may use this information to identify client device(s) 210 to which the notification is to be sent.

In this way, exfiltration detection device 240 may detect data exfiltration after the data exfiltration occurs (e.g., when the exfiltrated data is accessed or used). For example, exfiltration detection device 240 may detect data exfiltration that security device 220 failed to detect (e.g., using process 400 of FIG. 4) due to the exfiltration information being encrypted and/or due to a time delay before the exfiltration information is exfiltrated.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
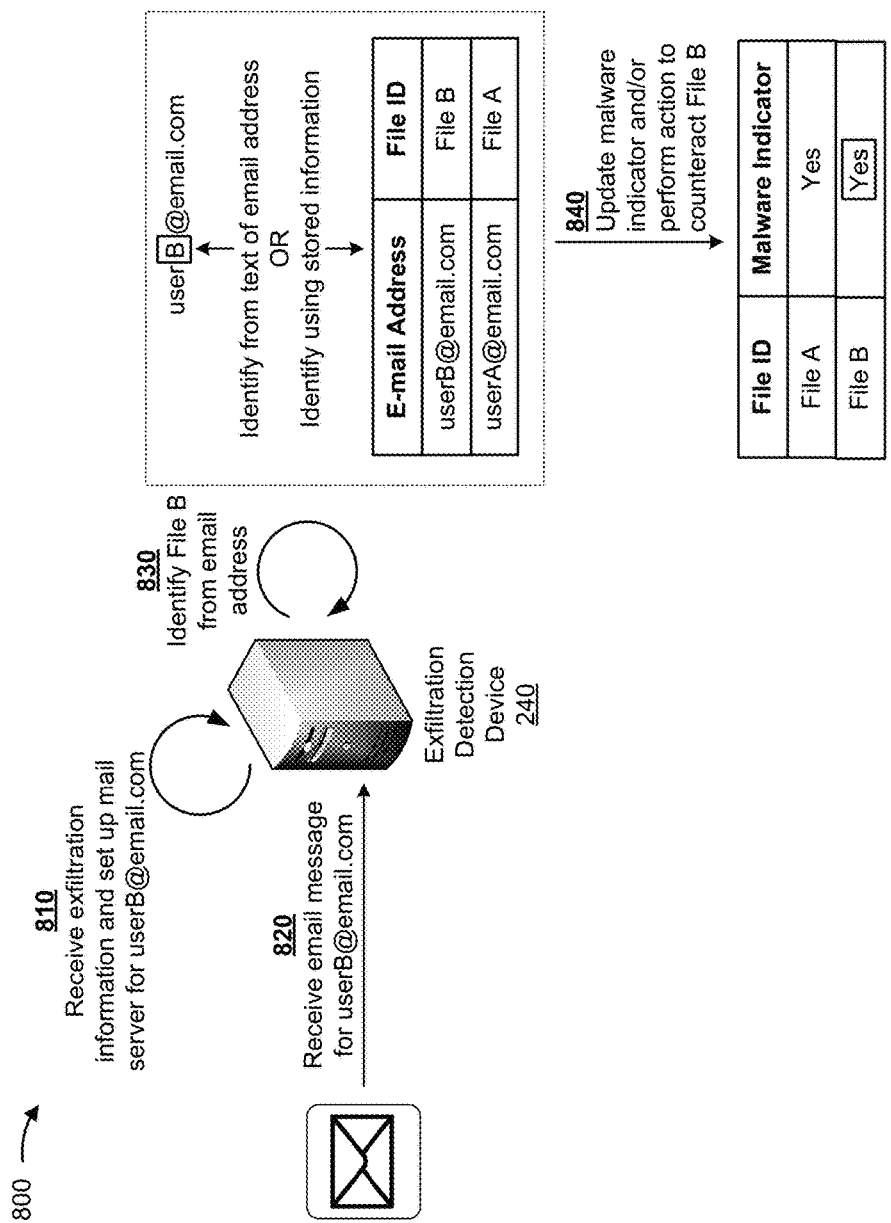
FIG. 8 is a diagram of an example implementation relating to the example process shown in FIG. 7.

FIG. 8 is a diagram of an example implementation 800 relating to example process 700 shown in FIG. 7. FIG. 8 shows an example of detecting data exfiltration after the data exfiltration has occurred. For the purpose of FIG. 8, assume that the operations described herein in connection with FIGS. 6A and 6B have been performed. In other words, assume that security device 220 has failed to detect data exfiltration in association with File B.

As shown in FIG. 8, and by reference number 810, assume that exfiltration detection device 240 receives exfiltration information and generates resources based on resource identifiers included in the exfiltration information. For example, assume that exfiltration detection device 240 sets up a mail server for receiving email associated with the email address of "userB@email.com." As shown by reference number 820, assume that exfiltration detection device 240 receives an email message at the email address "userB@email.com." For example, assume that File B has exfiltrated this email address, and at a later time, a malicious user and/or a device associated with a malicious user has sent an email message to this email address.

As shown by reference number 830, assume that exfiltration detection device 240 identifies File B using the email address, thereby indicating that File B exfiltrated the email address. For example, and as shown, exfiltration detection device 240 may identify File B using text from the email address (e.g., which uses the "B" from the file name of "File B"), or may identify File B using a data structure that correlates the email address to File B. As shown by reference number 840, based on identifying File B as a data exfiltration malware application, exfiltration detection device 240 updates a malware indicator, associated with File B, to indicate that File B is malware. Additionally, or alternatively, exfiltration detection device 240 may perform an action to counteract File B, such as notifying a client device 210 that previously accessed (e.g., downloaded, stored, executed, etc.) File B that File B is malware. In this way, exfiltration detection device 240 may assist in detecting data exfiltration after the data exfiltration has occurred (e.g., when the exfiltrated data is being accessed and/or used).

As indicated above, FIG. 8 is provided merely as an example. Other examples are possible and may differ from what was described with regard to FIG. 8.

Implementations described herein assist in detecting data exfiltration as the data exfiltration occurs and/or after the data exfiltration occurs. In this way, the likelihood of detecting data exfiltration increases, thereby providing better information security.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors, implemented at least partially in hardware, to:
receive, from a security device, exfiltration information that was exfiltrated by a file after the file is executed in a testing environment of the security device and after the security device fails to detect the exfiltration information in outbound network traffic that leaves the security device or the testing environment,
the outbound network traffic being monitored by the security device,
the exfiltration information including program code or a script that accesses a resource,
the program code or the script including a resource identifier that identifies the resource,
the resource identifier including a file identifier, and
the file identifier identifying the file;
determine that the resource has been accessed;
identify, based on determining that the resource has been accessed and based on the exfiltration information, the file; and
perform an action, associated with the file, to counteract data exfiltration based on determining that the resource has been accessed and based on identifying the file.

2. The device of claim 1,
where the one or more processors are further to:
create the resource based on identifying the exfiltration information; and
where the one or more processors, when determining that the resource has been accessed, are to:
determine that the resource has been accessed after creating the resource.

3. The device of claim 1, where the one or more processors, when receiving the exfiltration information, are to:
receive the exfiltration information after the testing environment fails to detect the data exfiltration based on monitoring the outbound network traffic for the exfiltration information.

4. The device of claim 1, where the resource identifier includes at least one of:
an email address, or
a uniform resource identifier (URI).

5. The device of claim 1, where the file identifier is generated using steganography.

6. The device of claim 1, where the file identifier comprises a hash value, and
where the one or more processors, when identifying the file, are to:
identify the file based on decoding the hash value.

7. A non-transitory computer-readable medium storing instructions, the instructions comprising:
one or more instructions that, when executed by one or more processors, cause the one or more processors to:
receive, from a security device, exfiltration information that was exfiltrated by a file, after the file is executed in a testing environment of the security device and after the security device fails to detect the exfiltration information in outbound network traffic that leaves the security device or the testing environment,
the outbound network traffic being monitored by the security device,
the exfiltration information including program code or a script that accesses a resource,
the program code or the script including a resource identifier that identifies the resource,
the resource identifier including a file identifier, and
the file identifier identifying the file;
determine that the resource has been accessed;
identify, based on determining that the resource has been accessed and based on the exfiltration information, the file; and
perform an action to counteract data exfiltration based on identifying the file.

8. The non-transitory computer-readable medium of claim 7, where the one or more instructions, that cause the one or more processors to receive the exfiltration information, cause the one or more processors to:
receive the exfiltration information after the testing environment fails to detect the data exfiltration based on monitoring the outbound network traffic for the exfiltration information.

9. The non-transitory computer-readable medium of claim 7, where the one or more instructions, that cause the one or more processors to perform the action to counteract the data exfiltration, cause the one or more processors to:
set a malware indicator, in a data structure, to indicate that the file is suspicious.

10. The non-transitory computer-readable medium of claim 7, where the resource includes at least one of:
a first resource associated with an email address,
a second resource associated with a uniform resource identifier (URI), or
a third resource associated with a network address.

11. The non-transitory computer-readable medium of claim 7, where the file identifier is generated using steganography.

12. The non-transitory computer-readable medium of claim 7,
where the file identifier comprises a hash value, and
where the one or more instructions, that cause the one or more processors to identify the file, cause the one or more processors to:
identify the file based on decoding the hash value.

13. The non-transitory computer-readable medium of claim 7, where the one or more instructions, that cause the one or more processors to perform the action to counteract the data exfiltration, cause the one or more processors to:
provide a notification to one or more client devices that received the file,
the notification indicating that the file is malware.

14. A method, comprising:
receiving, by a device and from a security device, exfiltration information that was exfiltrated by a file after the file is executed in a testing environment of the security device and after the security device fails to detect the exfiltration information in outbound network traffic that leaves the security device or the testing environment,
the outbound network traffic being monitored by the security device,
the exfiltration information including program code or a script that accesses a resource,
the program code or the script including a resource identifier that identifies the resource,
the resource identifier including a file identifier, and
the file identifier identifying the file;
determining, by the device, that the resource has been accessed;
identifying, by the device, based on determining that the resource has been accessed and based on the exfiltration information, the file; and
performing, by the device, an action to counteract data exfiltration based on determining that that the resource has been accessed and based on identifying the file.

15. The method of claim 14, where receiving the exfiltration information comprises:
receiving the exfiltration information after the testing environment fails to detect the exfiltration information in the outbound network traffic for a threshold amount of time.

16. The method of claim 14,
where the resource identifier includes an email address; and
where the resource is identified by the email address.

17. The method of claim 14,
where the resource identifier includes a uniform resource identifier (URI); and
where the resource is identified by the URI.

18. The method of claim 14, where the file identifier is generated using steganography.

19. The method of claim 14, where the file identifier comprises a hash value, and
where identifying the file comprises:
identifying the file based on decoding the hash value.

20. The method of claim 14, where performing the action to counteract the data exfiltration comprises:
setting an indicator to indicate that the file is suspicious.

* * * * *